Patented Apr. 10, 1951

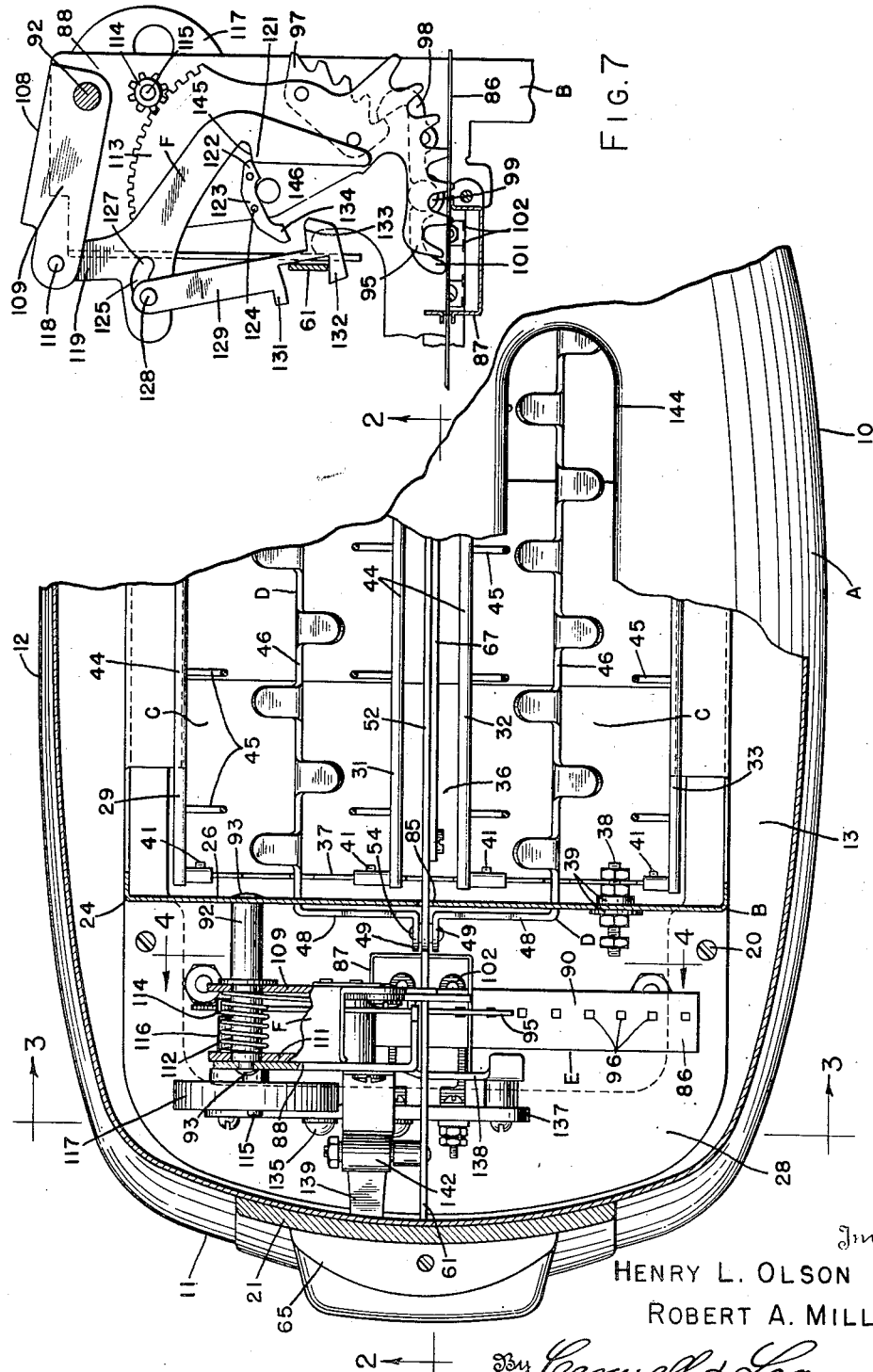

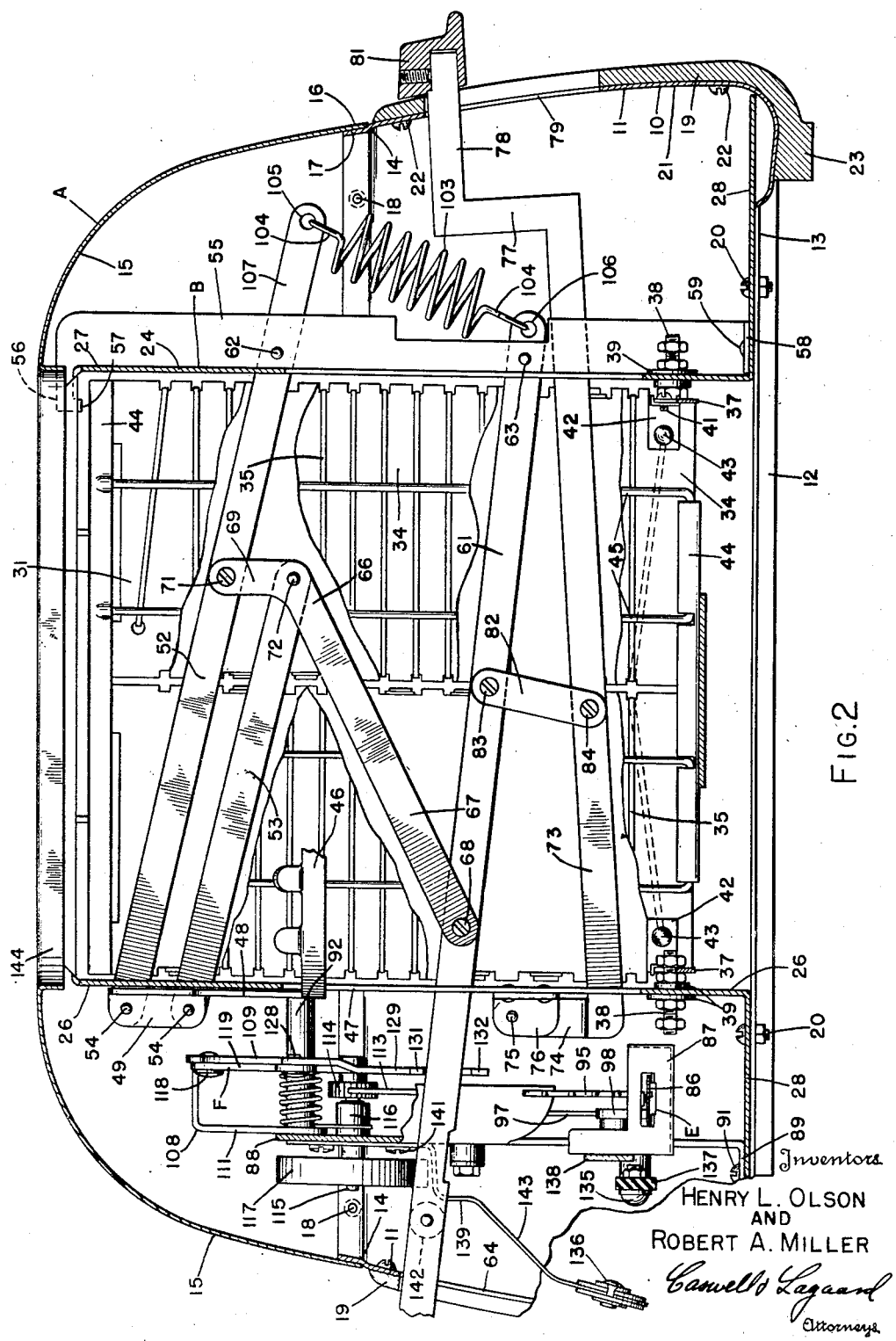

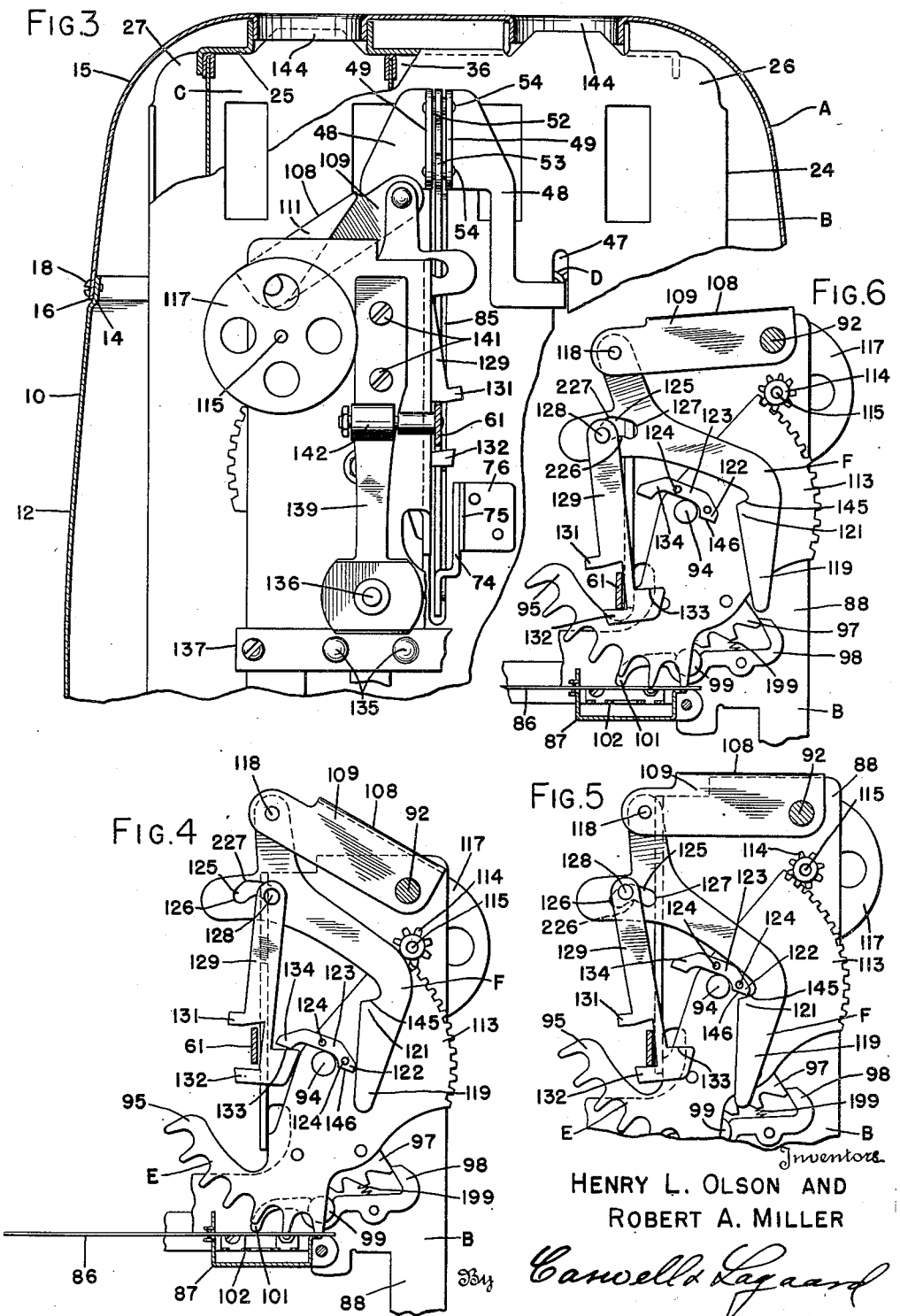

2,548,680

UNITED STATES PATENT OFFICE 2,548,680

ELECTRIC BREAD TOASTER

Henry L. Olson and Robert A. Miller, Grand Haven, Mich., assignors to Camfield Manufacturing Company, Grand Haven, Mich., a corporation of Michigan Original application May 13, 1949, Serial No. 93,059. Divided and this application July 2, 1949, Serial No. 102,834

8 Claims. (Cl. 99—335)

The object of the instant invention resides in providing an electric bread toaster constructed as hereinafter set forth and having the functions and advantages recited.

The bread toaster disclosed in this application consists of a case A in which is disposed a framework B. The framework B and associated parts provides two vertical bread ovens C into which the bread may be placed through suitable openings in the upper portion of the case A. Within the framework B is disposed two vertically movable bread racks D which support the bread within the ovens C and which are spring biased to non-toasting position. A timing mechanism E is adapted to determine the cooking period and operates to release a latching device F whereupon the bread racks are returned to normal position at the end of the cooking period. The timing mechanism includes a revoluble member having catch engaging means forming part of the latching device F and adapted to be engaged by a catch formed on a latch movable with the bread racks and also forming part of the latching device F. In conjunction with the latching device F, a manual release G is employed whereby movement of the operating member of the invention a first time resets the timing mechanism E, and operation of said member a second time releases the timing mechanism and brings the bread racks to non-toasting position. This is accomplished by using a connector between the operating member and the latch shiftable to a first and second position with reference to the latch to cause the catch to engage the catch engaging means when said connector is in its first position and actuated by the operating member and to cause the catch to become disengaged from the catch engaging means when said connector is in its second position and the operating member is again operated. The manual release G further includes resetting means operable upon completion of a toasting period and adapted to move said connector to its first position and cam means acting between said latch and connector and adapted upon reverse movement of said operating member to move said connector to its second named position.

This application for patent is a division of the copending application for patent of Henry L. Olson et al., for Electric Bread Toasters, Serial No. 93,059, filed May 13, 1949.

In the drawings:

Fig. 1 is a plan view of a portion of an electric toaster illustrating an embodiment of our invention with portions broken away to illustrate the construction thereof.

Fig. 2 is a longitudinal elevational sectional view of the toaster taken substantially on line 2—2 of Fig. 1.

Fig. 3 is a fragmentary cross sectional view taken substantially on line 3—3 of Fig. 1.

Fig. 4 is a fragmentary cross sectional view taken substantially on line 4—4 of Fig. 1.

Figs. 5, 6 and 7 are views similar to Fig. 4 showing the parts in altered positions.

The case A of our invention as best shown in Fig. 2 consists of a lower case section 10 which extends about the entire toaster and which has ends 11 and sides 12. The lowermost part of the case section 10 has a flange 13 extending inwardly therefrom and on which the toaster mechanism rests. The upper part of the section 10 has an offset 14 formed in the same and which provides a recess 17. Overlying the section 10 is an upper case section 15. This case section is dome-shaped in form and the lower marginal portion 16 of said case section is received within the recess 17 formed by the offset 14. Screws 18 extending through the lowermost marginal portion 16 and threaded into the offset 14 hold the parts of the case assembled. Attached to the ends 11 of the case section 12 are end pieces 19 which are preferably constructed of some plastic material and which form ornaments for dressing up the case structure. These end pieces have body portions 21 which overlie the ends 11 of the case and are secured thereto by means of screws 22. These end pieces furthermore have feet 23 which are disposed beneath the section 10 and support the entire toaster above the table on which it rests to provide ventilation and retard the transfer of heat to the table. The section 15 of the case A is constructed with openings 144 which register with the bread ovens C and through which the bread may be inserted into said ovens and placed upon the bread racks D.

Within the case A is located the framework B which supports the mechanism of the invention. This framework consists of a frame 24, of inverted U-shaped form, having an upper longitudinally extending frame member 25 and two vertically extending frame members 26 and 27 connected thereto. The frame members 26 and 27 have flanges 28 projecting outwardly therefrom and lying in a common plane. These flanges rest upon the flange 13 and support the frame structure through the lower case section 10. Screws 20 hold the framework B attached to the case A.

Within the framework B is provided four heating elements 29, 31, 32 and 33 which consists of sheets of mica 34 on which are wound suitable resistors 35. These heating elements in conjunction with the vertical frame members 26 and 27, form the two bread ovens C which are disposed between the heating elements 29 and 31 and between the heating elements 32 and 33. The heating elements 31 and 32 are also separated from one another to form a space 36 therebetween and in which certain of the mechanism of the invention is disposed. For supporting the heating elements 29, 31, 32 and 33 two bars 37 are employed which extend transversely of the frame members 26 and 27 and are attached thereto by means of screws 38. The said screws are insulated from the frame by insulating washers 39. Other screws 41 extend through said bars and through angle brackets 42 secured to the various heating elements by means of rivets 43. The heating elements 29, 31, 32 and 33 have reinforcing strips 44 secured to the upper and lower ends of the same and which also serve for attachment of guide wires 45. These guide wires are spaced from the resistors 35 and prevent the toast from coming in direct contact therewith and burning.

For supporting the toast within the oven C the two bread racks D are employed. These bread racks consist of elongated bars 46 which extend through slots 47 in the vertical frame members 26 and 27 and are guided for vertical movement therein. One end of each of said bars has an arm 48 bent outwardly therefrom and which terminates in a lug 49. The lugs 49 straddle two levers 52 and 53 and are pivotally connected thereto by means of rivets 54.

The lever 52 is pivoted to an upright 55 by means of a rivet 62. This upright is secured to the frame B in the following manner: The upper end of said upright has a finger 56 which extends over the horizontal frame member 25 and is formed with a lug 57 which projects downwardly through said frame member. The lower end of the upright 55 has a flange 58 projecting outwardly therefrom which is secured by means of a rivet 59 to the flange 28 of frame 24. Another lever 61 hereinafter referred to as a rack lever is also pivoted to the upright 55 by means of a rivet 63 and extends completely through the frame 24 and through a slot 64 in one of the ends 11 of the case section 10. This lever forms the operating member by means of which the bread racks D are moved into toasting position and by means of which the said bread racks may be subsequently released. The lever 61 has attached to it a knob 65 by which said lever may be depressed. Extending between the lever 52 and the lever 61 is a bell crank 66 which has one long arm 67 pivoted to the lever 61 by means of a screw 68. The said lever has a short arm 69 which is pivoted to the lever 52 by means of a screw 71. Lever 53 is pivoted to the bell crank 66 by means of a rivet 72. Below the lever 61 is another lever 73. This lever extends completely through the frame 24 and its innermost end is formed with an upstanding arm 74. This arm is pivoted by means of a rivet 75 to a bracket 76 secured to the vertical frame member 26. The said lever has an offset 77 at its opposite end and which terminates in an extension 78 projecting through a slot 79 in the end 11 of case A. A knob 81 is attached to the projecting end of the said lever. The levers 61 and 73 are connected together intermediate their ends by means of a link 82 which is pivoted to said levers by screws 83 and 84. The levers 52, 53, 61 and 73 all operate in slots 85 formed in the two vertical frame members 26 and 27. The ends of both of the levers 52 and 61 project outwardly beyond the vertical frame member 27. These ends of said levers have attached to them a tension coil spring 103 which has its ends 104 hooked into holes 105 and 106 in the said levers. The end 107 of the lever 52 projects outwardly beyond the upright 55 an appreciable amount so that considerable movement is given to the lever 54 tending to urge the said lever upwardly and to move the bread racks D into non-toasting position.

The timing mechanism E on the invention is of the type disclosed in the patent to R. Sardeson 2,365,909, issued December 26, 1944. This timing mechanism includes a strip of bimetal 86 which is mounted for reciprocating movement in a guide 87. Guide 87 is attached to an end plate 88 forming part of the framework B. The end plate 88 has a foot 89 which rests upon and is attached to the flange 28 of frame member 26 by means of a screw 91. The upper end of the said end plate is held in proper relation with the vertical frame members 26 by means of a spacer 92. The ends of said spacer are reduced as indicated at 93 and extend through the plate 88 and the vertical frame member 26 and are riveted over as best shown in Fig. 1 to hold the parts attached to one another.

Pivotally mounted on a shaft 94 is a gear segment 95 which is adapted to cooperate with a rack 90 formed on the strip of bimetal 86 by means of spaced openings 96. The shaft 94 is secured to the plate 88. The gear segment 95 has attached to it a section 97 of a ratchet wheel, the teeth of which cooperate with a catch 98. Catch 98 is pivoted on a pintle 99 which is also attached to the plate 88. The said catch includes a finger 101 which rests on the bimetal and which is adapted to be raised to disengage the catch 98 from the section 97 of the ratchet wheel and release the gear segment 95, one tooth at a time. A spring 199 secured to the catch 98 and to the plate 88 urges the finger 101 against the strip of bimetal 86. The bimetal is heated by means of a heater 102 disposed within the guide 87. It will readily be comprehended that the rate of heating of the bimetal determines the length of time required for the operation of the timing mechanism E for each cooking period.

The latching device F includes a U-shaped arm 108 hereinafter referred to as a catch arm which has spaced flanges 109 and 111. This arm is pivotally supported on the spacer 92 which is in the form of a rod and which extends through the two flanges 109 and 111. A torsion spring 112 encircles the spacer 92 between the flanges 109 and 111 and is attached to flange 109 and to the plate 88 to cause said arm to swing normally upwardly as shown in Figs. 3 and 4.

The arm 108 has pivoted to the flange 109 thereof by means of a rivet 118 a depending latch 119. Latch 119 has a catch 121 at the lower end of the same which is formed with a surface 145 adapted to engage a corresponding surface 146 on a catch engaging member 122. This catch member forms part of a bar 123 which is secured to the gear segment 95 by means of rivets 124. The manual release G is closely associated with the latching device F and utilizes the following construction. The latch 119 is formed with an arcuate slot 125 having depressed ends 126 and 127. This construction provides a hump 226 at the lower portion of the slot and a recess 227 at the upper portion of said slot. As viewed in Figs. 4, 5 and 6 the recess 227 is somewhat to the left of the hump 226 for a purpose to be presently explained. In the slot 125 is mounted a pintle 128 which may travel freely from one end of the slot to the other. This pintle is secured to a depending link 129 which forms a connector between the latch 119 and the lever 61. This link is constructed with spaced fingers 131 and 132 at its lower end. These fingers straddle the lever 61 and when the said lever is moved downwardly the said link imparts to the latch 119 downward movement.

A gear segment 113 is formed on the gear segment 95 which is adapted to mesh with a gear pinion 114. This pinion is attached to a shaft 115 which is journaled in a bearing 116 mounted on the plate 88. A flywheel 117 is also attached to the shaft 115 and the said flywheel absorbs the energy produced by the spring 103 and allows the bread racks D to move less rapidly to normal position at the end of the timing period.

For resetting the timing device E link 129 is formed with a shoulder 133. This shoulder is adapted to engage a lug 134 on the bar 123 and to rotate the gear segment 95 in a direction opposite to that resulting from the operation of the timing mechanism E, thus resetting the timing mechanism. This shoulder serves as a cam which acts when engaged by the lug 134 to shift the link 129 toward the right and to move pintle 128 to the end 127 of slot 125.

In conjunction with the lever 61 a switch mechanism for energizing and deenergizing the heaters is employed which includes fixed contacts 135 and a movable contact member 136. The contacts 135 are mounted on an insulating support 137 attached to a portion 138 of plate 88. The contact member 36 is secured to the end of a spring 139 which is also attached to the plate 88 by means of screws 141. A cam follower 142 secured to the lever 61 engages a cam 143 on the spring 139 and moves the contact member 136 into engagement with the contacts 135.

The operation of the invention is as follows: The parts are normally arranged as shown in Figs. 3 and 4 with the pintle 128 disposed in the end 127 of slot 125. Downward movement of the lever 61 causes the latch 119 to travel downwardly. It will be noted that the slot 125 is exactly below the rivet 118 serving as the pivot for arm 108. In such position the force is applied to the latch 119 to the right of the vertical plane passing through the axis of the rivet 118. This causes the catch 121 to be drawn against the catch engaging member 122. When the said catch passes beneath said member the catch hooks onto the same as shown in Fig. 5. Upon release of the lever 61 the pintle 128 rides along the upper surface of the slot 125 and reaches the recess 227 which is situated intermediate the ends of the slot, as shown in Fig. 5. Spring 103 now urges the lever 52 and correspondingly the lever 61 upwardly and said lever through link 129 and catch 119 energizes the mechanism E. As the timing mechanism operates gear segment 95 rotates and as it rotates the bar 123 rotates with it until it reaches the position shown in Fig. 7. As the bar 123 rotates, the angularity of the surface 146 thereof with respect to the direction of movement of the latch 119 varies and becomes more acute. The friction between the surfaces 145 and 146 hence becomes less and the direction of extent of the surface 146 approaches the direction of movement of the latch 119 so that the catch 121 rocks on the surface 146 and is released from the catch engaging member 122 without excess force. Upon further movement of the timing mechanism the latch is released and the lever 61 and associated parts move upwardly. The shoulder 133 on link 129 then engages the lug 134 on bar 123 and resets the timing mechanism. It will be noted that the lug 134 is to the right of the slot 125. This causes the pintle 128 to be forced into the end 127 of slot 125 where it resumes the position shown in Fig. 4. The latch 129 is now reset to cause the timing mechanism to again repeat its cycle.

If during the toasting period it becomes desirable to manually release the bread racks, the same can be accomplished by depressing the lever 61 a second time. The position of the parts during toasting is shown in Fig. 5. It will be noted that pintle 128 is to the left of hump 226. Downward pressure on the finger 132 when the parts are arranged as shown in Fig. 5, causes the pintle 128 to travel to the end 126 of the slot 125. This applies force to the latch 119 in a direction forcing the catch 121 out of engagement with the lug 122. Upon release of the lever the bread racks are returned to normal position through the action of the spring 103.

The advantages of the invention are manifest. With our invention release of the bread racks and deenergization of the toaster is accomplished by movement of the operating member a second time. Thus the operating member performs two functions. It is hence possible to greatly reduce the number of parts and to simplify the construction of the toaster and yet retain all of the functions of a toaster having manual release. The desired results are produced merely by constructing the latch member with a banana-shaped slot in which a pintle mounted on the connector is movable and in utilizing parts already provided in the toaster for operating the same.

Changes in the specific form of our invention, as herein described, may be made within the scope of what is claimed without departing from the spirit of our invention.

Having described our invention, what we claim as new and desire to protect by Letters Patent is:

1. In a bread toaster, a bread rack movable toward and from toasting position, a spring for urging said bread rack from toasting position, a timing device for determining the toasting period and including a movable catch engaging member, an operating member connected to and moving said bread rack toward toasting position a latch movable with the bread rack and having a catch adapted to engage the catch engaging member and when engaged holding the bread rack in toasting position, said catch engaging member forming a release means operated by said timing device and causing disengagement of the catch with the catch engaging member to release the bread rack upon completion of a toasting period, a connector between said operating member and latch and movable in the direction of movement of the bread rack to bring the catch into a position to engage the catch engaging member, said connector being shiftable to either a first position or a second position relative to the latch, said connector when in its first position urging the catch into engagement with the catch engaging member, when moved by said operating member and when in its second position urging the catch out of engagement with said catch engaging member when moved by the operating member in the same direction to manually release the bread rack, resetting means for the timing device operable upon completion of the toasting period by the operating member and adapted to move said connector to its first position, and cam means acting between said latch and connector and adapted upon reverse movement of said operating member to move said connector into its second named position.

2. In a bread toaster, a bread rack movable toward and from toasting position, a spring for urging said bread rack from toasting position, a timing device for determining the toasting period and including a catch engaging member, an operating member for moving said bread rack toward toasting position, a latch having a catch, guide means for guiding said latch for movement in the direction of movement of the bread rack, pivot means for guiding said latch for movement bringing said catch into or out of engagement with the catch engaging member, a connector between said operating member and latch and movable in the direction of movement of the bread rack to bring the catch into a position to engage the catch engaging member, said connector being shiftable to either a first position or a second position relative to the latch, said connector when in its first position swinging the latch about its pivot means when moved by said operating member to bring the catch into engagement with said catch engaging member and when in its second position swinging the latch about its pivot means in the opposite direction when moved by said operating member to move the catch out of engagement with said catch engaging member, resetting means for the timing device operable upon completion of the toasting period and adapted to move said connector to its first position, and cam means acting between said latch and connector and adapted upon reverse movement of said operating member to move said connector into its second named position.

3. In a bread toaster, a bread rack movable toward and from toasting position, a spring for urging said bread rack from toasting position, a timing device for determining the toasting period and including a catch engaging member, an operating member for moving said bread rack toward toasting position, a latch having a catch, a pivoted arm, pivot means between latch and arm positioned for movement in the direction of movement of the bread rack, said pivot means guiding said latch for movement to bring said catch into or out of engagement with the catch engaging member, a connector between said operating member and latch and movable in the direction of movement of the bread rack to bring the catch into a position to engage the catch engaging member, said connector being shiftable to either a first position or a second position relative to the latch, said connector when in its first position swinging the latch about its pivot means when moved by said operating member to bring the catch into engagement with said catch engaging member and when in its second position swinging the latch about its pivot means in the opposite direction when moved by said operating member to move the catch out of engagement with said catch engaging member, resetting means for the timing device operable upon completion of the toasting period and adapted to move said connector to its first position, and cam means acting between said latch and connector and adapted upon reverse movement of said operating member to move said connector into its second named position.

4. In a bread toaster a frame, a bread rack guided for vertical movement relative thereto and movable toward and from bread toasting position, a spring for urging said bread rack for movement from its toasting position, a timing device for determining the toasting period and including a catch engaging member, an operating member guided for vertical movement and adapted to move the bread rack into toasting position, an arm pivoted to said frame, a latch, pivot means between said arm and latch and positioned substantially above said operating member, said pivot means being movable in a substantially vertical direction, a catch on said latch adapted to move into or out of engagement with said catch engaging member upon swinging of said latch about its pivot means, a connector between said operating member and latch and movable in a substantially vertical direction and moving the latch into latching position upon movement of the operating member and bread rack into toasting position, said connector being shiftable relative to said latch in a substantially horizontal direction to occupy either a first or a second position relative to said latch, said connector when in its first position and moved by said operating member exerting a swinging movement on said latch serving to move the catch into engagement with said catch engaging member and when in its second position and operated by said operating member exerting a swinging movement on said latch in the opposite direction urging the catch out of engagement with said catch engaging member, cam means between said connector and latch for moving said connector into its second named position upon upward movement of the operating member and shifting means operable upon release of the catch for shifting said connector to its first named position.

5. In a bread toaster a frame, a bread rack guided for vertical movement relative thereto and movable toward and from bread toasting position, a spring for urging said bread rack for movement from its toasting position, a timing device for determining the toasting period and including a catch engaging member, an operating member guided for vertical movement and adapted to move the bread rack into toasting position, an arm pivoted to said frame, a latch, pivot means between said arm and latch and positioned substantially above said operating member, said pivot means being movable in a substantially vertical direction, a catch on said latch adapted to move into or out of engagement with said catch engaging member upon swinging of said latch about its pivot means, a connector between said operating member and latch and movable in a substantially vertical direction and moving the latch into latching position upon movement of the operating member and bread rack into toasting position, said connector and latch having juxtaposed parts, one of said parts having a banana-shaped slot therein, said slot having a first end and a second end, a cam formed in said part along one edge of said slot, a cam follower on the other part adapted to travel along said slot and when in the first end upon being urged downwardly by said operating member swinging said latch to bring said catch into engagement with said catch engaging member, and when in the second end of the slot upon being urged downwardly by said operating member swinging said latch to disengage the catch from the catch engaging member said cam upon upward movement of the operating member directing said cam follower toward the second end of the slot.

6. In a bread toaster a frame, a bread rack guided for vertical movement relative thereto and movable toward and from bread toasting position, a spring for urging said bread rack for movement from its toasting position, a timing device for determining the toasting period and including a catch engaging member, an operating member guided for vertical movement and adapted to move the bread rack into toasting position, an arm pivoted to said frame, a latch, pivot means between said arm and latch and positioned substantially above said operating member, said pivot means being movable in a substantially vertical direction, a catch on said latch adapted to move into or out of engagement with said catch engaging member upon swinging of said latch about its pivot means, a connector between said operating member and latch and movable in a substantially vertical direction and moving the latch into latching position upon movement of the operating member and bread rack into toasting position, said connector and latch having juxtaposed parts, one of said parts having a banana-shaped slot therein said slot having a first end and a second end, a cam formed in said part along one edge of said slot, a cam follower on the other part adapted to travel along said slot and when in the first end upon being urged downwardly by said operating member swinging said latch to bring said catch into engagement with said catch engaging member, and when in the second end of the slot upon being urged downwardly by said operating member swinging said latch to disengage the catch from the catch engaging member said cam upon upward movement of the operating member directing said cam follower toward the second end of the slot and shifting means operable upon release of the catch for shifting said cam follower to the other end of said slot.

7. In a broad toaster a frame, a bread rack guided for vertical movement relative thereto and movable toward and from bread toasting position, a spring for urging said bread rack for movement from its toasting position, a timing device for determining the toasting period and including a catch engaging member, an operating member guided for vertical movement and adapted to move the bread rack into toasting position, an arm pivoted to said frame, a latch, pivot means between said arm and latch and positioned substantially above said operating member, said pivot means being movable in a substantially vertical direction, a catch on said latch adapted to move into or out of engagement with said catch engaging member upon swinging of said latch about its pivot means, a connector between said operating member and latch and movable in a substantially vertical direction and moving the latch into latching position upon movement of the operating member and bread rack into toasting position, said latch having a banana-shaped slot therein, said slot having a first end and a second end disposed below the intermediate portion of the slot, a cam formed on the latch along the upper edge of said slot, a cam follower on said connector adapted to travel along said slot and when in the first end upon being urged downwardly by said operating member swinging said latch to bring said catch into engagement with said catch engaging member, and when in the second end of the slot upon being urged downwardly by said operating member swinging said latch to disengage the catch from the catch engaging member said cam upon upward movement of the operating member directing said cam follower toward the second end of the slot.

8. In a bread toaster, a bread rack movable toward and from toasting position, a spring for urging said bread rack from toasting position, a timing device for determining the toasting period and including a movable catch engaging member, an operating member connected to and moving said bread rack toward toasting position, a latch movable with the bread rack and having a catch adapted to engage the catch engaging member and when engaged holding the bread rack in toasting position, said catch engaging member forming a release means operated by said timing device and causing disengagement of the catch with the catch engaging member to release the bread rack upon completion of a toasting period, a connector between said operating member and latch and movable in the direction of movement of the bread rack to bring the catch into a position to engage the catch engaging member, said connector being shiftable to either a first position or a second position relative to the latch, said connector when in its first position urging the catch into engagement with the catch engaging member, when moved by said operating member and when in its second position urging the catch out of engagement with said catch engaging member when moved by the operating member in the same direction to manually release the bread rack, and shifting means for moving said connector from one position to the other and resetting means acting between the operating member and the timing mechanism for resetting the timing mechanism on reverse movement of the operating member.

HENRY L. OLSON.
ROBERT A. MILLER.

REFERENCES CITED

The following references are of record in the file of this patent:

UNITED STATES PATENTS

| Number | Name | Date |
| --- | --- | --- |
| 1,729,937 | Ginder | Oct. 1, 1929 |
| 2,001,362 | Ireland | May 14, 1935 |
| 2,336,640 | Sardeson | Dec. 14, 1943 |
| 2,336,696 | McCullough | Dec. 14, 1943 |
| 2,402,576 | Purpura | June 25, 1946 |